United States Patent Office 3,406,210
Patented Oct. 15, 1968

3,406,210
PREPARATION OF HALOPOLYOLEFINS
Louis Schmerling, Riverside, Ill., assignor to Universal Oil Products Company, Des Plaines, Ill., a corporation of Delaware
No Drawing. Filed June 3, 1965, Ser. No. 461,191
The portion of the term of the patent subsequent to Apr. 26, 1983, has been disclaimed
9 Claims. (Cl. 260—648)

ABSTRACT OF THE DISCLOSURE

Reaction of polyhaloolefins with monoolefins at about 50–300° C. in presence of organic peroxides and other free radical generating compounds to form halopolyolefins.

This invention relates to the preparation of halopolyolefins. More particularly, this invention relates to the condensation of polyhaloolefins with olefinic hydrocarbons to form said halopolyolefins. The halopolyolefins prepared in accordance with the method of this invention may be hydrolyzed to yield unique aldehydes and acids and are useful as chemical intermediates in the preparation of polymeric materials, pharmaceutical, insecticides, and other useful products. For example, 3-(2-chlorovinyl)-1-cyclohexene, formed by the condensation of 1,2-dichloroethylene with cyclohexene according to the method of this invention, is condensable with hexachlorocyclopentadiene in the preparation of insecticides.

It is an object of this invention to present a novel method for reacting certain polyhaloolefins and olefinic hydrocarbon to form condensation products thereof. In one of its broad aspects the present invention embodies a method for effecting the condensation of a polyhaloolefin with an olefinic hydrocarbon which comprises forming a mixture of a polyhaloolefin, an olefinic hydrocarbon and a free radical generating compound and reacting the polyhaloolefin and the olefinic hydrocarbon by heating said mixture at a temperature of from about 50° C. to about 300° C. and at least as high as the decomposition temperature of said free radical generating compound, the aforesaid polyhaloolefin being characterized in that it contains at least one chlorine atom attached to each of two doubly-bonded carbon atoms, and the aforesaid olefinic hydrocarbon being characterized in that it contains at least one carbon atom in alpha position to the double bond, said carbon atom having attached thereto at least one hydrogen atom.

Another embodiment relates to a method for effecting the condensation of a polyhaloolefin with a monoolefinic hydrocarbon and comprises forming a mixture of a polyhaloolefin, a monoolefinic hydrocarbon and a peroxy compound and reacting the polychloroolefin with the monoolefinic hydrocarbon by heating said mixture at a temperature of from about 50° C. to about 300° C. and at least as high as the decomposition temperature of said peroxy compound, the aforesaid polyhaloolefin being characterized in that it contains at least one chlorine atom attached to each of the two doubly-bonded carbon atoms, and the aforesaid monoolefinic hydrocarbon being characterized in that it contains at least one carbon atom in the alpha position to the double bond, said carbon having attached thereto at least one hydrogen atom.

Still another embodiment concerns a method for effecting the condensation of a polyhaloalkene with a monoolefinic hydrocarbon which comprises forming a mixture of a polyhaloalkene, a monoolefinic hydrocarbon and an organic peroxide and reacting the polychloroalkene with the monoolefinic hydrocarbon by heating said mixture at a temperature of from about 50° C. to about 300° C. and at least as high as the decomposition temperature of said organic peroxide, the aforesaid polyhaloalkene being characterized in that it contains at least one chlorine atom attached to each of two doubly-bonded carbon atoms, and the aforesaid monoolefinic hydrocarbon being characterized in that it contains at least one carbon atom in alpha position to the double bond, said carbon atom having attached thereto at least one hydrogen atom.

A further embodiment is in a method for effecting the condensation of a polyhalocycloalkene with a monoolefinic hydrocarbon which comprises forming a mixture of a polyhalocycloalkene, a monoolefinic hydrocarbon and an organic peroxide and reacting the polyhalocycloalkene with the monoolefinic hydrocarbon by heating said mixture at a temperature of from about 50° C. to about 300° C. and at least as high as the decomposition temperature of said organic peroxide, the aforesaid polyhalocycloalkene being characterized in that it contains at least one chlorine atom attached to each of two doubly-bonded carbon atoms, and the aforesaid monoolefinic hydrocarbon being characterized in that it contains at least one carbon atom in alpha position to the double bond, said carbon atom having attached thereto at least one hydrogen atom.

One preferred embodiment of this invention relates to a method for effecting the condensation of 1,2-dichloroethylene with 2-butene which comprises forming a mixture of 1,2-dichloroethylene, 2-butene and di-t-butyl peroxide, reacting the 1,2-dichloroethylene and 2-butene by heating said mixture at a temperature of from about 130° C. to about 280° C. and forming 1-chloro-1,4-hexadiene.

Another of the preferred embodiments is in the condensation of trichloroethylene with cyclohexene to form 3-(2,2-dichlorovinyl) - 1 - cyclohexene which comprises forming a mixture of trichloroethylene, cyclohexene and di-t-butyl peroxide, reacting the trichloroethylene and cyclohexene by heating said mixture at a temperature of from about 130° C. to about 280° C.

Other objects and embodiments of this invention will become apparent in the following detailed specification.

Polyhaloolefins which can be condensed with olefinic hydrocarbons hereinafter described comprise polychloroolefins having at least one chlorine atom attached to each of the doubly-bonded carbon atoms. As is readily observed, this type of configuration still leaves one valence of each of the doubly-bonded carbon atoms free, and these free valences may be taken up by substituents such as hydrogen atoms, halogen atoms including fluorine, chlorine and bromine, and alkyl groups such as methyl, ethyl, propyl, etc., or a haloalkyl group such as fluoromethyl group, chloromethyl group, bromomethyl group, dichloromethyl group, chloromethyl group, trifluoromethyl group, etc., or an aryl group. A preferred species of these polychloroolefins comprises polychloroethylenes, in which each of the doubly-bonded carbon atoms has at least one chlorine attached thereto. Examples of suitable polychloroolefins include 1,2-dichloroethylene,
trichloroethylene,
1-fluoro-1,2-dichloroethylene,
1-bromo-1,2-dichloroethylene,
tetrachloroethylene,
1,2-difluoro-1,2-dichloroethylene,
1,2-dibromo-1,2-dichloroethylene,
1-fluoro-2-bromo-1,2-dichloroethylene,
1,2-dichloro-1-propene,
1,1,2-trichloro-1-propene,
1,1,2,3-tetrachloro-1-propene,
1,2,3-trichloro-1-propene,
1,2,3,3-tetrachloro-1-propene, 1,2,3,3,3-pentachloro-1-propene,
1-fluoro-1,2-dichloro-1-propene,
1,2-difluoro-1,2-dichloro-1-propene,
3-fluoro-1,2-dichloro-1-propene,
1,3,3-trifluoro-1,2-dichloro-1-propene,
3,3,3-trifluoro-1,2-dichloro-1-propene,
1,2-dichloro-1,3-difluoro-1-propene,
1-bromo-1,2-dichloro-1-propene,
3,3-dibromo-1,2-dichloro-1-propene,
3-bromo-1,2-dichloro-1-propene,
1,3-dibromo-1,2-dichloro-1-propene,
3,3,3-tribromo-1,2-dichloro-1-propene,
1,3,3-tribromo-1,2-dichloro-1-propene,
1,2-dichloro-1-butene,
2,3-dichloro-2-butene,
1,2-dichloro-3-methyl-1-butene,
1,1,2-trichloro-1-butene,
1,2,3-trichloro-1-butene,
1,1,2,3-tetrachloro-1-butene,
1,1,1-trifluoro-2,3-dichloro-2-butene,
1,2,3,3-tetrachloro-1-butene,
1,1,2-trichloro-3-methyl-1-butene,
1,2-dichloro-1-pentene,
2,3-dichloro-2-pentene,
1,2-dichloro-1-hexene,
2,3-dichloro-2-hexene,
3,4-dichloro-3-hexene,
1,2-dichloro-1-heptene,
1,2-dichloro-1-octene,
1,2-dichloro-1-nonene,
1,2-dichloro-1-decene, etc.

It is essential that the polychloroolefins contain at least two chlorine atoms per molecule since monochloroolefins do not give a condensation reaction of the type herein contemplated. Similarly, polyhaloolefins other than the polychloroolefins containing at least one chlorine atom on each of the doubly-bonded carbon atoms do not give reactions of the type described herein. For example, 1,2-bibromoethylene as well as tribromoethylene are inoperative in the process of the present invention. As set forth hereinabove, polychloroolefins such as 3,3,3-trifluoro-1,2-dichloro-1-propene that contain one or more fluorine atoms may be used in this process since the fluorine atoms in such compounds do not noticeably affect the activity of the chlorine atoms. Likewise, one or more fluorine atoms may be attached to the doubly-bonded carbon atoms provided that the above-mentioned requirement for chlorine atoms attached to the doubly-bonded carbon atoms is met.

Olefinic hydrocarbons which can be utilized in accordance with the method of this invention are those containing at least one carbon atom in alpha position to the double bond, said carbon atom having attached thereto at least one hydrogen atom. Suitable olefinic hydrocarbons include aliphatic as well as alicyclic olefinic hydrocarbons.

It is preferred that said olefinic hydrocarbons be monoolefins. Preferred olefinic hydrocarbons thus include propene, 1-butene, 2-butene, isobutylene, 2-methyl-1-butene, 3-methyl-1-butene, 2-methyl-2-butene, 1-pentene, 2-pentene, 2-methyl-1-pentene, 3-methyl-1-pentene, 2-methyl-2-pentene, 3-methyl-2-pentene, 4-methyl-2-pentene, etc., and also cycloolefinic hydrocarbons, for example, cyclopentene, methylcyclopentenes, ethylcyclopentenes, cyclohexene, methylcyclohexenes, ethylcyclohexenes, cycloheptene, methylcycloheptenes, ethylcycloheptenes, cyclooctene, cyclodecene, and the like. Bicyclic olefins such as bicyclo[2.2.1]-2-heptene (2-norbornene) may also be used.

The selected polyhaloolefins and olefinic hydrocarbon are reacted in contact with a free radical generating compound which acts to initiate the condensation reaction at reaction conditions. Suitable free radical generating compounds include peroxy compounds containing the bivalent radical —O—O— which decompose to form free radicals and initiate the condensation reaction. Examples of such free radical generating compounds include the persulfates, perborates, and the percarbonates of ammonium and of the alkali metals. Organic peroxy compounds constitute a preferred class of peroxy compounds and include peracetic acid, presuccinic acid, dimethyl peroxide, diethyl peroxide, diisopropyl peroxide, di-t-butyl peroxide, acetyl peroxide, butyryl peroxide, lauroyl peroxide, benzoyl peroxide, 2,4-dichlorobenzoyl peroxide, tetralin peroxide, urea peroxide, t-butylperbenzoate, t-butyl hydroperoxide, methylcyclohexyl hydroperoxide, diisopropylbenzoyl hydroperoxide, cumene hydroperoxide, methylethylketone peroxide, cyclohexanone peroxide, etc., the dialkyl and diacyl peroxides being particularly preferred. Mixtures of peroxy compounds may be employed as catalysts, or said peroxy compounds may be utilized in admixture with various diluents. Thus, commercially available organic peroxy compounds compounded with various diluents, including benzoyl peroxide composited with calcium sulfate, benzoyl peroxide composited with camphor, etc., may be utilized. Only catalytic amounts (less than stoichiometric amounts) may be used in the process.

The present process is effected at a temperature at least as high as the initial decomposition temperature of the particular free radical generating compound employed. Free radical generating compounds such as peroxy compounds, particularly organic peroxides, decompose at a measurable rate with time in a logarithmic function dependent upon temperature. This rate of decomposition is ordinarily expressed as the half life of a peroxide at a particular temperature. For example, the half life in hours for di-t-butyl peroxide is 17.5 hours at 125° C., 5.3 hours at 135° C., and 1.7 hours at 145° C. (calculated from data for the first 33% decomposition). A reaction temperature is selected at which the free radical generating compound will decompose with the generation of sufficient free radicals to initiate the condensation reaction and at which temperature the half life of said compound is such as to cause the reaction to proceed smoothly at a suitable rate. When the half life of the free radical generating compound is greater than 10 hours, radicals are not generated at a sufficient rate to cause the contemplated reaction to go forward at a satisfactory rate. Thus, the reaction temperature may be within the range of from about 50° C. to about 300° C. and at least as high as the decomposition temperature of the free radical generating compound, by which is meant a temperature such that the half life of the free radical generating compound is usually not greater than 10 hours. Since the half life for each free generating compound is different at different temperatures, the exact temperature to be utilized in a particular reaction will vary. However, persons skilled in the art are well acquainted with the half life versus temperature data for different free radical generating compounds. Thus, it is within the skill of one familiar with the art to select the particular temperature needed for any particular initiator. However, the operating temperature generally should not exceed the decomposition temperature of the free radical generating compound by substantially more than about 150° C. since free radical generating catalysts decompose rapidly under such high temperature conditions. For example, the half life of t-butyl perbenzoate is less than 10 hours at 110° C., and the therefore when this peroxy compound is used, the reaction temperature is from about 110° C. to about 300° C., but generally lower than about 265° C. A reaction temperature of from about 130° C. to about 280° C. is suitable when the peroxy compound is di-t-butyl peroxide and of from about 75° C. to about 300° C., but generally not in excess of about 225° C., with benzoyl peroxide. Higher reaction temperatures may be employed, but little advantage is gained if the temperature is in excess of the decomposition temperature of the free radical generating compound by more than about 150° C. as hereinbefore mentioned.

The reaction conditions herein utilized relate principally to temperature. Although it may be desirable to employ superatmospheric pressures of up to about 100 atmospheres or more, for example, to maintain the reactants in a liquid phase during the course of the reaction, pressure is not considered to be an important variable in relation to the herein described condensation reaction and in many cases may be simply autogenous pressure developed during the course of the reaction. In batch type operations it is often desirable to seal the reaction mixture in a closed vessel and to pressure the vessel to 10 or 30 or 50 or more atmospheres with an inert gas such as nitrogen to insure liquid phase reaction conditions.

The concentration of the free radical generating compound will vary over a rather wide range. However, a relatively low concentration, say from about 0.1 weight per cent to about 10 weight percent based on the weight of the polychloroolefin, effectively catalyzes the condensation reaction. The reaction time may be from less than 1 minute to several hours, depending on the temperature of the reaction and on the half life of the catalyst. Generally speaking, the contact times of at least 10 minutes are preferred.

The condensation reaction herein contemplated between a polyhaloolefin having at least one chlorine atom attached to each of the doubly-bonded carbon atoms and an olefinic hydrocarbon containing at least one carbon atom in alpha position to the double bond which contains at least one hydrogen atom attached thereto, is illustrated by the following equations showing the condensation of 2-butene with 1,2-dichloroethylene.

$CH_3CH=CHCH_3+ClCH=CHCl\rightarrow$
$CH_3CH=CHCH_2CH=CHCl$
$+ClCH=CHCH_2CH=CHCH_2CH=CHCl$ Hydrogen chloride is evolved in the condensation reactions herein disclosed. In cases where it is desirable to avoid radical changes in pH during the course of the reaction, small amounts of materials which have a buffering effect on the pH may be included in the reaction mixture. For example, an alkaline pH can be maintained by the use of buffers such as borax, disodium phosphate, sodium carbonate, ammonium carbonate, sodium acetate, etc.

The process of this invention may be effected in any suitable manner and may comprise a batch or continuous type of operation. In the case of a batch type of operation, a quantity of starting materials comprising an olefin, a polychloroolefin, and a free radical generating compound is charged to a suitable reaction vessel and heated therein at a preselected reaction temperature. The reaction vessel may be a closed vessel or it may be an open vessel with an overhead reflux condenser. The vessel should in either case be provided with heating means as well as mixing means to insure adequate contact of reactants and the free radical generating compound. At the expiration of a suitable reaction period, the vessel contents are cooled to about room temperature, treated with dilute alkali, water-washed and dried. The dried reaction product is recovered from the unreacted starting materials by conventional means, for example, by fractional distillation.

The product of this invention may be prepared in a continuous type of process wherein the reactants and the free radical generating compound are charged in a continuous stream to a reactor maintained at the proper conditions of temperature and pressure. The reactor may be an unpacked vessel or coil, or it may contain an adsorbent packing material such as firebrick, alumina, dehydrated bauxite, and the like. The reaction mixture is continuously withdrawn from the reactor at a rate which will insure adequate residence time therein. The product is separated from the reactor effluent and unreacted starting materials are recycled for further use as a portion of the feed material.

The following examples are presented to further illustrate the process of this invention. Said examples are for the purpose of illustration only and are not intended as a limitation in any manner on the generally broad scope of this invention as set out in the appended claims.

Example I

A mixture of 0.5 mole of cis-1,2-dichloroethylene, 1.0 mole of 2-butene and 0.05 mole of di-t-butyl peroxide are charged to an 850 cubic centimeter glass lined autoclave and sealed therein under 30 atmospheres of nitrogen at about room temperature. The autoclave is then rotated and heated at 130–140° C. over a period of about 4 hours. Thereafter, the autoclave is cooled to room temperature and vented to the atmosphere. The autoclave contents are water-washed, dried and distilled to yield 1-chloro-1,4-hexadiene and 1,8-dichloro-1,4,7-octatriene fraction.

Example II 1,1-dichloro-1,4-pentadiene is prepared by charging about 2 moles of trichloroethylene, 4 moles of propene and 0.1 mole of di-t-butyl peroxide to a glass lined autoclave and heating the same therein under 30 atmospheres initial nitrogen pressure at 130–140° C. over about a 4 hour period while rotating the autoclave. The autoclave is thereafter cooled and vented to the atmosphere. The autoclave contents are water-washed, dried and distilled to yield the 1,1,-dichloro-1,4-pentadiene fraction.

Example III

Trichloroethylene (0.76 mole), 1.0 mole of cyclohexene and 0.055 mole of di-t-butyl peroxide in an 850 cc. glass liner are sealed in an autoclave under 30 atmospheres of nitrogen at about room temperature. The autoclave is then rotated and heated at 130–140° C. over about a 4 hour period. Thereafter, the autoclave is cooled to room temperature and vented to the atmosphere. The autoclave contents are water-washed, dried and distilled to yield a 3-(2,2-dichlorovinyl)-1-cyclohexene fraction. There is also obtained 1-chloro-2 (or 3)-(2,2-dichlorovinyl)-cyclohexane formed by the addition of hydrogen chloride (formed during the reaction) to the aforementioned primary product.

Example IV 3-(2,2-dichlorovinyl)-1-cyclooctene is prepared by sealing about 0.5 mole of trichloroethylene, 0.7 mole of cyclooctene and 0.05 mole of di-t-butyl peroxide in a glass liner into an autoclave and heating the same therein under 30 atmospheres initial nitrogen pressure at 130–140° C. over about a 4 hour period while rotating the autoclave. The autoclave is thereafter cooled and vented to the atmosphere. The autoclave contents are water-washed, dried and distilled to yield the 3-(2,2-dichlorovinyl)-1-cyclooctene fraction.

Example V

About 2 moles of 3,3,3-trifluoro-1,2-dichloro-1-propene, 6 moles of cyclopentene and 0.1 mole of di-t-butyl peroxide are charged to a glass lined autoclave and sealed therein under 30 atmospheres of nitrogen at about room temperature. The autoclave is then rotated and heated at 130–140° C. over a period of about 4 hours. Thereafter, the autoclave is cooled to room temperature and vented to the atmosphere. The autoclave contents are water-washed, dried and distilled to yield at 3-(3,3,3-trifluoro-2-chloro-1-propenyl)-1-cyclopentene fraction.

I claim as my invention:

1. A method for effecting the condensation of a polyhaloolefin with a monoolefinic hydrocarbon which comprises forming a mixture of a polyhaloolefin, a monoolefinic hydrocarbon and a peroxy compound and reacting the polyhaloolefin with the monoolefinic hydrocarbon by heating said mixture at a temperature of from about 50° C. to about 300° C. and at least as high as the decomposition temperature of said peroxy compound, the aforesaid polyhaloolefin being characterized in that the halogens are selected from the group consisting of chlorine, bromine and fluorine and in that it contains from 2 to 10 carbon atoms per molecule and at least one chlorine atom attached to each of two doubly-bonded carbon atoms, and the aforesaid monoolefinic hydrocarbon being characterized in that it contains at least one carbon atom in alpha position to the double bond, said carbon having attached thereto at least one hydrogen atom, said monoolefinic hydrocarbon being an alkene of from 3 to 6 carbon atoms per molecule or a cycloalkene of from 5 to 10 carbon atoms per molecule.

2. The method of claim 1 further characterized in that said monoolefinic hydrocarbon is an aliphatic monoolefinic hydrocarbon.

3. The method of claim 1 further characterized in that said monoolefinic hydrocarbon is an alicyclic monoolefinic hydrocarbon.

4. The method of claim 1 further characterized in that said peroxy compound is an organic peroxide.

5. A method for effecting the condensation of 1,2-dichloroethylene with 2-butene which comprises forming a mixture of 1,2-dichloroethylene, 2-butene and di-t-butyl peroxide, reacting the 1,2-dichloroethylene and 2-butene by heating said mixture at a temperature of from about 130° C. to about 280° C. and forming 1-chloro-1,4-hexadiene.

6. A method for effecting the condensation of trichloroethylene with propylene which comprises forming a mixture of trichloroethylene, propene and di-t-butyl peroxide, reacting the trichloroethylene and propylene by heating said mixture at a temperature of from about 130° C. to about 280° C. and forming 1,1-dichloro-1,4-pentadiene.

7. A method for effecting the condensation of trichloroethylene with cyclohexene which comprises forming a mixture of trichloroethylene, cyclohexene and di-t-butyl peroxide, reacting the trichloroethylene and cyclohexene by heating said mixture at a temperature of from about 130° C. to about 280° C. and forming 3-(2,2-dichlorovinyl)-1-cyclohexene.

8. A method for effecting the condensation of 3,3,3-trifluoro-1,2-dichloro-1-propene with cyclopentene which comprises forming a mixture of 3,3,3-trifluoro-1,2-dichloro-1-propene, cyclopentene and di-t-butyl peroxide, reacting the 3,3,3 - trifluoro - 1,2 - dichloro-1-propene and cyclopentene by heating said mixture at a temperature of from about 130° C. to about 280° C. and forming 3-(3,3,3-trifluoro-2-chloro-1-propenyl)-1-cyclopentene.

9. A method for effecting the condensation of cyclooctene with trichloroethylene which comprises forming a mixture of trichloroethylene, cyclooctene and di-t-butyl peroxide, reacting the trichloroethylene and cyclooctene by heating said mixture at a temperature of from about 130° C. to about 280° C. and forming 3-(2,2-dichlorovinyl)-1-cyclooctene.

References Cited

UNITED STATES PATENTS 3,248,434  4/1966  Schmerling _____ 260—648

OTHER REFERENCES

Morrison et al.: "Org. Chem." pl. 177 (1959) OD, 251.M72.

LEON ZITVER, *Primary Examiner.*

M. JACOB, *Assistant Examiner.*